United States Patent Office 3,296,294
Patented Jan. 3, 1967

3,296,294
PERFLUOROOCTYL TETRACHLOROPHTHALATE
William A. Zisman, 200 E. Melbourne Ave., Silver Spring, Md. 20901, and Jacques G. O'Rear, Camp Springs, Md. (5420 Henderson Road SE., Washington, D.C. 20031)
No Drawing. Filed Jan. 10, 1963, Ser. No. 250,717
1 Claim. (Cl. 260—475)

The invention described herein may be manufactured and used by or for the Government of the United States of America for governmental purposes without the payment of any royalties thereon or therefor.

This invention relates to fluorocarbon derivatives, more particularly to a new polyfluoroalkyl ester.

In the field of surface active agents for organic solvents, the art is confronted by the fact that there are no surface active agents which are equally efficient in all organic solvents. The most suitable surface active agents for a particular organic solvent depend on the difference in surface tension of the solute and the solvent, the greater this difference, the higher the efficiency of the solute as a surface active agent for the solvent.

The new polyfluoroalkyl ester of our invention is the diester, bis (1H,1H-perfluorooctyl) tetrachlorophthalate. It is a highly efficient surface active agent in small concentrations which are in the range of from 0.0001–0.1 mole/liter for lowering the surface tension of the organic solvents, propylene carbonate, nitromethane, ethyl benzene and dioxane.

The new diester may be prepared by reacting 1H, 1H-perfluorooctyl alcohol, $F(CF_2)_7CH_2OH$, with tetrachloro, as, phthalyl chloride

which may be obtained by the method of Kaufman and Voss, Ber., 56, 2511 (1923). Nitrogen is bubbled through the reaction mixture to remove the formed hydrogen chloride. Evolution of hydrogen chloride is measured by passing the escaping purge gas through a standard base.

Example

Nitrogen at the rate of 200 cc. per minute was bubbled through a refluxing mixture of 16 grams (0.047 mole) tetrachloro, as, phthalyl chloride and 62.4 grams (0.312 mole) 1H,1H-perfluorooctyl alcohol until the evolution of hydrogen chloride ceased (5 hours). The reaction residue was distilled to give 38.4 grams (76.4% yield) of a pure product: B.P. 188° C. at 2 mm. Hg and M.P. 58–67° C. from petroleum ether.

Theory on the mode of functioning of the new tetrachlorophalate diester as a surface active agent in organic solvents and data respecting the same as a surface active agent is contained in J. Physical Chemistry, 66, 328 (1962), which article, by reference, is incorporated herein and made part of this disclosure.

The addition of the tetrachlorophthalate surface active agent of the invention to the organic solvents increases their wetting power and oxidation stability and decreases their flamability and tendency to foam.

While the invention has been described herein with reference to a particular mode of preparing the new phthalate diester, such is intended by way of illustration and not in limitation.

What is claimed is:
Bis (1H,1H-perfluorooctyl) tetrachlorophthalate.

References Cited by the Examiner
UNITED STATES PATENTS
2,921,957   1/1960   O'Rear et al. _____ 260—475

OTHER REFERENCES
Bernett et al.: Journal of Physical Chemistry, vol. 66 (1962), pages 328–336.
Jarvis et al.: Journal of Physical Chemistry, vol. 63 (1959), pages 727–734.

LORRAINE A. WEINBERGER, *Primary Examiner.*
LEON ZITVER, *Examiner.*
R. E. MISSA, T. L. GALLOWAY, *Assistant Examiners.*